United States Patent [19]
Kendrick

[11] Patent Number: 4,702,458
[45] Date of Patent: Oct. 27, 1987

[54] QUICK RELEASE JACK

[76] Inventor: Billy J. Kendrick, 1104 Rice Ct., Arlington, Tex. 76012

[21] Appl. No.: 869,283

[22] Filed: Jun. 2, 1986

[51] Int. Cl.⁴ ............................................. B66F 3/16
[52] U.S. Cl. ..................................... 254/97; 254/420; 254/427; 74/405
[58] Field of Search ................... 254/420, 427, 95–97; 269/181, 186, 192, 184; 74/422, 405

[56] References Cited

U.S. PATENT DOCUMENTS

| | | | |
|---|---|---|---|
| 658,574 | 9/1900 | McDonnell | 269/181 |
| 947,573 | 1/1910 | Eager | 269/186 |
| 2,133,892 | 10/1938 | Gelinski | 269/181 |
| 3,623,718 | 11/1971 | Thomeczek | 269/184 |
| 3,921,958 | 11/1975 | Brockelsby et al. | 254/420 |
| 3,934,852 | 1/1976 | Weber et al. | 74/405 |

FOREIGN PATENT DOCUMENTS 396044 1/1909 France ................................. 254/96

Primary Examiner—Robert C. Watson
Attorney, Agent, or Firm—Glaser, Griggs & Schwartz

[57] ABSTRACT

A jacking apparatus having a quick release mechanism for disengaging the main shaft of the jack from the jacking gear to allow the main shaft to be selectively raised and lowered as desired without operating the jacking gear. The main shaft has a plurality of teeth disposed thereon in facing relationship with the jacking gear, which is preferably a worm gear mechanism. A stop bar is disposed between the shaft and the jack housing to hold the shaft in alignment with the worm gear mechanism when it is desired to operate the jacking gear. A spring-biased pin member extends through a diagonal slot disposed in the jack housing to engage the stop bar. When it is desired to disengage the shaft teeth from the jacking gear teeth, the user exerts upward pressure on the pin member to move the pin member and stop bar diagonally upward along the axis of the slot, thereby retracting the stop bar from the shaft and allowing the shaft to be rotated to disengage the shaft teeth from the jacking gear teeth. The shaft can then be rapidly moved up and down as desired by the user when there is no load on the jack. To re-engage the shaft teeth with the jacking gear teeth, the user merely rotates the shaft back in the opposite direction, whereupon the spring bias will return the pin member and stop bar to their original position to lock the shaft in place.

16 Claims, 5 Drawing Figures

4,702,458

QUICK RELEASE JACK

FIELD OF THE INVENTION

The present invention relates generally to jacking devices and in particular to a jacking device having a quick release mechanism.

BACKGROUND OF THE INVENTION

Jacking devices are used in a variety of applications for raising and lowering objects. One such application is to raise and lower one end of an automobile or other vehicle so as to be able to change a flat tire or to facilitate access to components on the underside of the vehicle. Another application is to support the front end of a boat trailer or the like while the trailer is disengaged from a tow vehicle such as a truck.

Jacking devices are typically comprised of an elongated toothed shaft, which mates with a user-operable jacking gear. The gear is operated by means of a rotatable handle or the like, which in turn rotates a worm gear mechanism, thereby causing the toothed shaft to migrate up or down along the toothed shaft to raise or lower the object supported by the jack, as the case may be. When a jack is used to support a boat trailer, the worm gear mechanism is typically fixed with respect to the trailer so that the toothed shaft moves up and down with respect to the trailer. Attached to the lower end of the shaft is a wheel for contacting the ground to support the jack. When it is desired to raise the level of the trailer, the wheel is positioned in contact with the ground and the shaft is lowered by the action of the worm gear until the trailer reaches the desired height. When the trailer is attached to a bumper hitch or the like on a tow vehicle, such as a truck, the shaft and wheel are raised so that the wheel does not contact the ground during transportation.

DESCRIPTION OF THE PRIOR ART

According to prior practice, the jack handle must be rotated a minimum of 30 rotations in order to raise the shaft and wheel when the trailer is attached to the bumper hitch. Similarly, the user must turn the handle a minimum of 30 rotations to lower the shaft so that the wheel makes proper contact with the ground when the trailer is to be disengaged from the bumper hitch. This process of raising and lowering the jack is time-consuming and laborious and often results in injury to the user's hands and knuckles when the jack handle is rotated in a confined space.

OBJECTS OF THE INVENTION

It is, therefore, the principal object of the present invention to provide an improved jacking device.

Another object of the invention is to provide a jacking device having a quick release mechanism.

Still another object of the invention is to provide an improved jacking device for supporting a boat trailer or the like.

SUMMARY OF THE INVENTION

These and other objects are accomplished in accordance with the present invention wherein a jacking apparatus is comprised of a shaft member having a plurality of teeth arranged longitudinally along the length thereof; rotatable gear means having a plurality of gear teeth for mating with respective ones of the teeth of the shaft member; means for rotating the gear means to move the shaft member along a vertical axis when the gear teeth are in mating engagement with the shaft teeth; and user-operable means for securing the shaft member in a predetermined position with respect to the gear means so that the shaft teeth are in mating engagement with the gear teeth when the user-operable means is in a first position and for allowing the shaft member to be rotated to disengage the shaft teeth from the gear teeth when the user-operable means is in a second position, thereby facilitating vertical movement of the shaft member when there is no load on the jacking apparatus.

In one embodiment the apparatus includes a housing in which the gear means and at least a portion of the shaft member are disposed. The user-operable means includes a moveable stop member which is disposed between the housing and the shaft member. In another embodiment the gear means is comprised of a worm gear mechanism. In still another embodiment the means for rotating the gear means is comprised of a rotatable shaft coupled to the gear means and a user-operable handle for rotating the shaft.

In the preferred embodiment the shaft member includes an elongated bar having substantially rectangular shape. The bar has a first surface which is in facing relationship with the gear means and second and third surfaces which are substantially orthogonal with respect to the first surface on opposite sides thereof. The shaft teeth are disposed on the first surface and the stop member is in contact with the second surface of the bar when the stop member is in the first position and is in contact with the first surface of the bar when the stop member is in the second position. The stop member is preferably comprised of a stop bar substantially in the shape of a rectangular prism. Selected portions of the stop bar and elongated bar (including a portiono f each shaft tooth) are bevelled to provide sufficient clearance between the shaft teeth and the stop bar to allow the shaft to be rotated when the stop bar is in the second position.

The means for moving the stop bar is preferably comprised of a pin member coupled to the stop bar and a spring member coupled to the pin member for biasing the pin member and stop member toward the first position. The housing has first and second parallel slots communicating between inner and outer surfaces thereof. The slots are oriented diagonally with respect to the shaft member. A portion of the pin member extends through the first slot to engage the stop bar. The stop bar includes a projection member extending through the second slot and engaging the outer surface of the housing. The projection member cooperates with the pin member to constrain the stop bar to move between the first and second positions along the respective axes of the first and second slots.

The jacking apparatus according to the present invention enables the user to quickly disconnect the shaft teeth from the gear teeth by moving the pin member and stop bar away from the shaft member to allow the shaft member to be rotated about its own axis until the shaft teeth are clear of the gear teeth. The shaft member can then be quickly moved in a vertical direction to adjust the position of the shaft member without resorting to the laborious process of cranking the jack handle. When it is desired to re-engage the shaft teeth with the gear teeth, the user merely rotates the shaft back in the opposite direction until the shaft teeth once again engage the gear teeth. The spring bias on the pin member will cause the pin member and stop bar to return to the "locking" position at which the stop bar is in contact with the shaft member to maintain it in alignment with the gear teeth.

BRIEF DESCRIPTION OF THE DRAWINGS

Other objects and advantages of the invention will be apparent from the detailed description and claims when read in conjunction with the accompanying drawings wherein:

DETAILED DESCRIPTION OF THE PREFERRED EMBODIMENT

In the description which follows, like parts are marked throughout the specification and drawings, respectively. The drawings are not necessarily to scale and in some instances proportions have been exaggerated in order to more clearly depict certain features of the invention.

Figure 1:
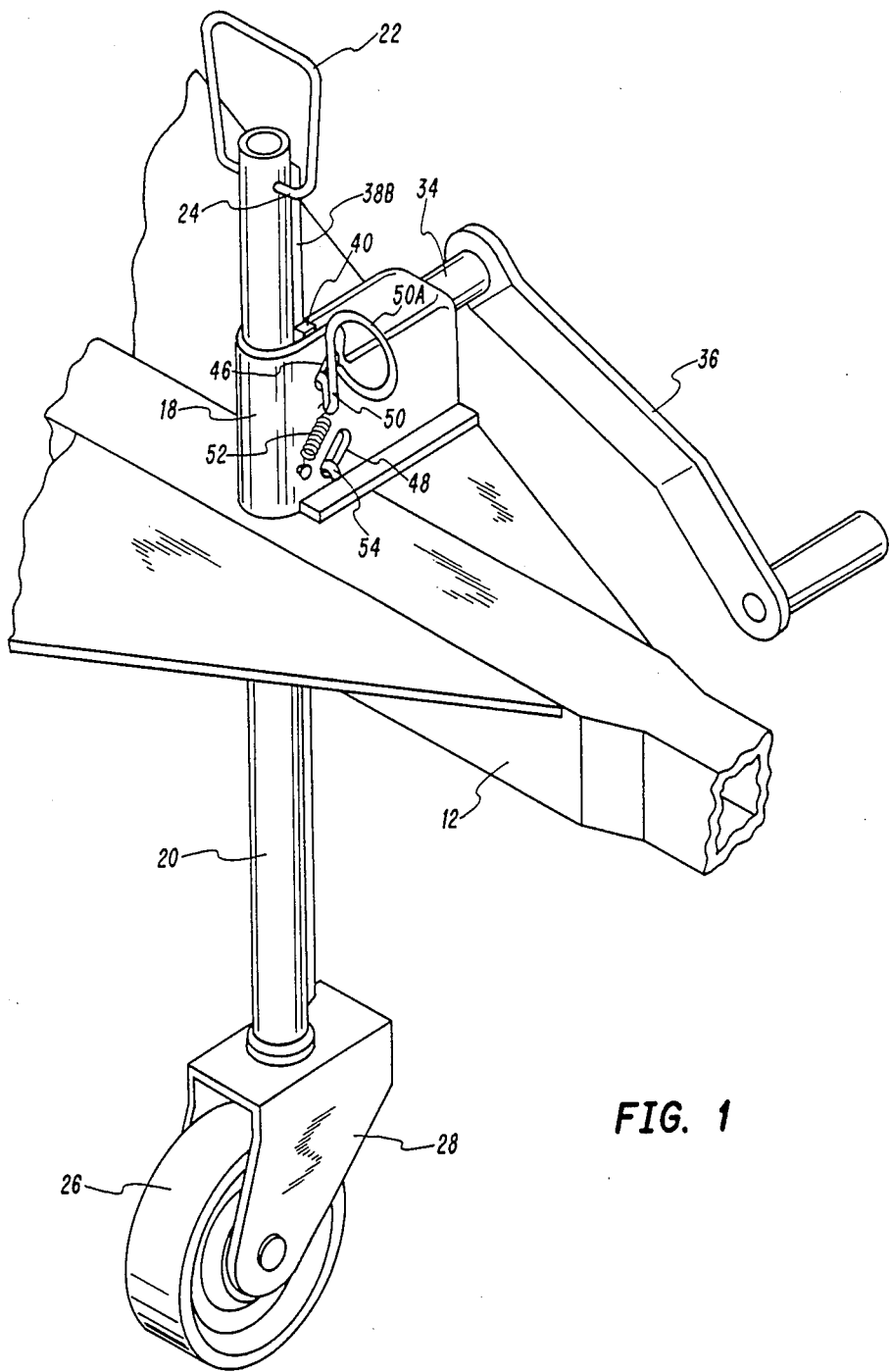
FIG. 1 is a perspective view of the jacking apparatus according to the present invention.

Referring to FIG. 1, a jacking apparatus 10 is mounted on the front end of a conventional trailer 12, such as a boat trailer or the like. Trailer 12 includes an attachment device 14 for coupling trailer 12 to a trailer hitch 16 mounted beneath the rear bumper of a tow vehicle (not shown).

Jacking apparatus 10 is comprised of a housing 18, which is mounted in a fixed position with respect to trailer 12, and a main shaft member 20, which is moveable in a vertical direction with respect to housing 18 and trailer 12 to adjust the height of the front end of trailer 12. Attached to shaft member 20 at the upper end thereof is a first handle 22, which enables a user to quickly and conveniently raise and lower shaft member 20 when the quick release mechanism of jacking apparatus 10 is activated, as will be described in greater detail hereinbelow. Handle 22 is secured on shaft member 20 by means of a horizontal pin 24, which extends through a pair of diametrically opposed openings in shaft member 20. Attached to shaft member 20 at the opposite end thereof is a wheel 26, which is retained within a wheel housing 28. Wheel 26 is rotatably mounted with respect to shaft member 20 so that wheel 26 is able to rotate about the axis of shaft member 20.

Figure 2:
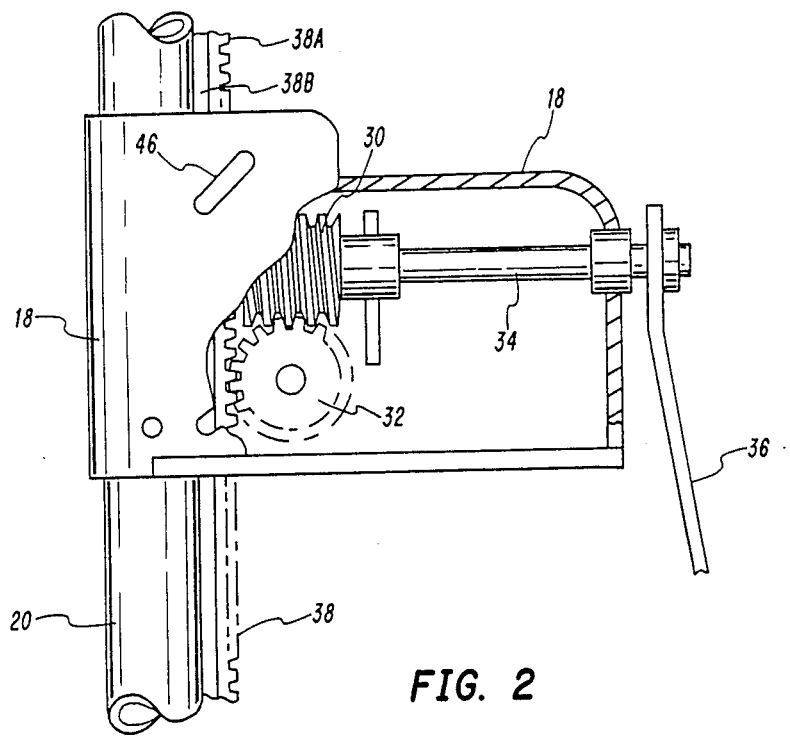
FIG. 2 is a partial cut-away view in elevation of the jacking device of FIG. 1, illustrating the gear mechanism by which the jacking apparatus is operated.

Referring also to FIG. 2, jacking apparatus 10 includes a worm gear mechanism, which is comprised of a worm 30 and main gear 32. Worm 30 is coupled to a shaft 34, which is in turn coupled to a user-operable handle 36 external to housing 18. Worm 30 and main gear 32 are disposed within housing 18 to protect the worm gear mechanism. The gear teeth of main gear 32 are in mating engagement with the helical threads of worm 30 so that the rotation of worm 30 by means of handle 36 rotates main gear 32 about a horizontal axis which is substantially orthogonal with respect to the axis of shaft 34. Main gear 32 preferably has a diameter on the order of 2⅛" to 2¼" and a thickness on the order of ⅜", with approximately 22 gear teeth disposed around the circumference of main gear 32.

The gear teeth of main gear 32 are also in mating engagement with a plurality of complementary teeth disposed substantially along the length of shaft member 20. Shaft member 20 has an elongated bar 38 attached thereto and extending substantially along the entire length thereof, which is in facing relationship with main gear 32. Bar 38 has a substantially rectangular shape and includes a first surface 38A containing the shaft teeth and a second surface 38B and third surface (not shown) which are each substantially orthogonal with respect to first surface 38A on opposite sides of first surface 38A.

Figure 3A:
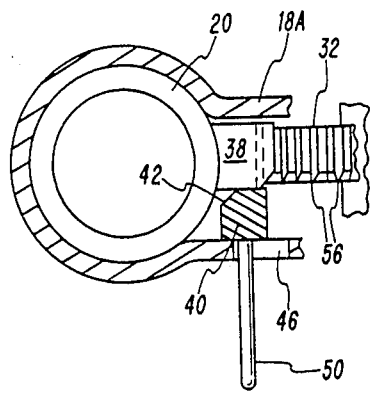
FIGS. 3A and 3B are top-plan views of a portion of the jacking apparatus according to the present invention, illustrating the jacking gear mechanism being engaged in FIG. 3A for operating the jacking apparatus and being disengaged in FIG. 3B to allow the shaft of the jack to move independently with respect to the gear mechanism.
Figure 3B:
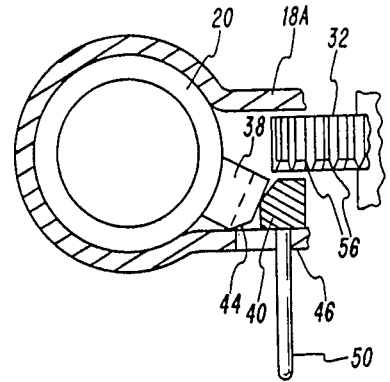

Disposed between housing 18 and second surface 38B of elongated bar 38 is a stop bar 40, which is substantially in the shape of a rectangular prism. Referring to FIGS. 3A and 3B, stpo bar 40 is bevelled along a portion thereof adjacent to shaft member 20 as indicated at 42, to provide a close tolerance between stop bar 40 and elongated bar 38. Stop bar 40 cooperates with a portion 18A of housing 18 on the opposite side of elongated bar 38 to maintain bar 38 substantially in alignment with main gear 32 so that the shaft teeth are maintained in mating engagement with the gear teeth of main gear 32. Similarly, a portion of elongated bar 38, including a portion of each shaft tooth, is bevelled as indicated at 44.

Housing 18 further includes first and second elongated slots 46 and 48, which are oriented diagonally as shown in FIG. 1. A pin member 50 extends through first slot 46 and is coupled to stop bar 40 for allowing the user to operate stop bar 40, as will be described in greater detail hereinbelow. Pin member 50 has a looped portion 50A through which the user may insert one or two of his fingers to manually move pin member 50 and stop bar 40. A spring member 52 is attached at one end thereof to pin member 50 and at the other end thereof to housing 18 for biasing pin member 50 and stop bar 40 to remain in the position shown in FIGS. 1 and 3A, at which pin member 50 is at the bottom of slot 46. The lower portion of stop bar 40 includes a projection member 54, which extends through second slot 48 and engages the outer surface of housing 18. Projection member 54 cooperates with pin member 50 to constrain stop bar 40 to move back and forth in a direction parallel to the respective axes of first and second slots 46 and 48. Slots 46 and 48 extend upwardly at an angle of approximately 45 degrees in a direction away from shaft member 20 as can best be seen in FIG. 1. Stop member 40 is therefore in the first position for locking shaft member 20 in alignment with main gear 32 when pin member 50 and projection member 54 are at their lowest positions with the respective first and second slots 46 and 48 and in the second position for allowing shaft member 20 to be disengaged from main gear 32 when pin member 50 and projection member 54 are at their highest positions within the respective first and second slots 46 and 48.

Referring to FIGS. 3A and 3B, the operation of the quick release mechanism of jacking apparatus 10 will now be described in detail. In FIG. 3A, bar 38 is held substantially in alignment with main gear 32 so that the shaft teeth are in mating engagement with the gear teeth. Shaft member 20 is held in the proper alignment by means of stop bar 40, which is in contact with second surface 38B of bar 38 to prevent shaft member 20 from rotating in a clockwise direction as viewed in FIG. 3A.

If one attempts to rotate shaft member 20 in a clockwise direction the cylindrical surface of main shaft member 20 will contact bevelled edge 42 of stop bar 40 so that stop bar 40 effectively locks shaft member 20 in position. Shaft member 20 can then be raised and lowered by turning handle 36 in a predetermined direction corresponding to the desired direction of movement of shaft member 20. Thus, FIG. 3A illustrates the normal operating position of jacking apparatus 10.

When it is desired to release shaft member 20 from main gear 32 to allow shaft member 20 to be moved independently thereof, the user must exert an upward force on pin member 50 to overcome the spring bias of spring member 52 and move pin member 50 and stop bar 40 from a first position, as illustrated in FIG. 3A, to a second position illustrated in FIG. 3B. When pin member 50 and stop bar 40 are moved to the second position, pin member 50 is at the top of first slot 46 and projection member 54 is at the top of second slot 48. By grasping handle 22 with his other hand, the user can rotate shaft member 20 in a clockwise direction so that the shaft teeth can slide out of engagement with the gear teeth. Bevelled portion 42 of stop bar 40 and bevelled portion 44 of bar 38 cooperate to allow bar 38 to clear stop bar 40 when stop bar 40 is moved to the second position as shown in FIG. 3B. A portion of each shaft tooth adjacent to stop bar 40 is bevelled and forms a part of bevelled portion 44. Similarly, corresponding portions of the main gear teeth are bevelled at 56 to facilitate alignment between the shaft teeth and gear teeth.

When bar 38 has been disengaged from main gear 32, the user can quickly raise and lower main shaft member 20 without the need for cranking handle 36. The stop bar is spring-biased downwardly towards the "locked" position so that the slide bar will return to the "locked" position when released. Should return spring 52 break or otherwise fail, the slide bar will tend to move into the "locked" position by the force of gravity.

Figure 4:
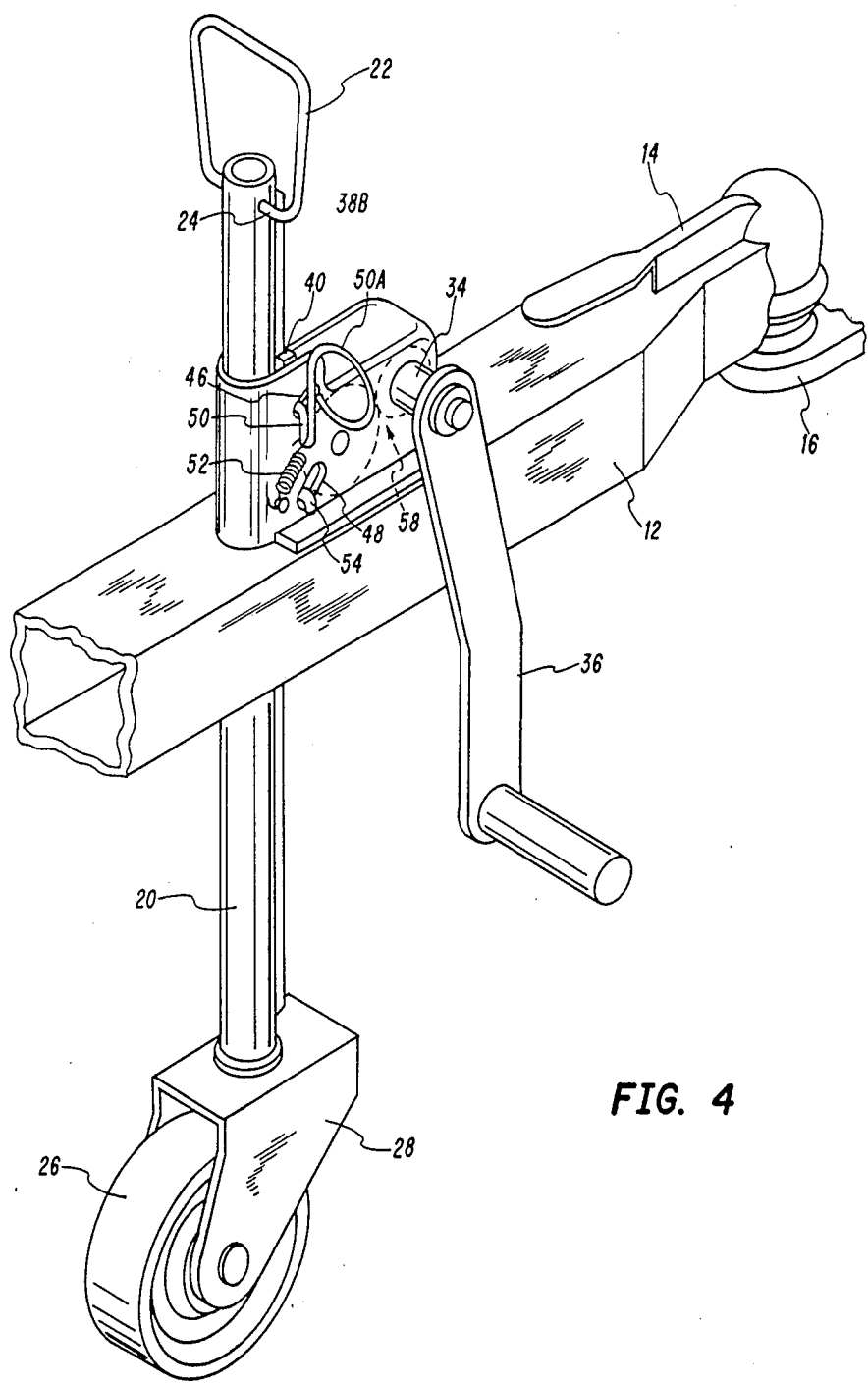
FIG. 4 is a perspective view of an alternative embodiment of the jacking apparatus.

A preferred embodiment of the invention has now been described in detail. An alternative arrangement having an off-set crank handle is shown in FIG. 4. In this arrangement, the crank shaft 34 is coupled to the crank handle 36 through a right angle spur gear assembly 58. Thus it will be appreciated that the above-described preferred embodiment may be altered without departing from the spirit and scope of the invention. The invention is therefore not to be limited by such variations, except as set forth in the appended claims.

What is claimed is:

1. A jacking apparatus, comprising:
   a shaft member having a plurality of teeth arranged longitudinally along the length thereof;
   rotatable gear means having a plurality of gear teeth for mating with respective ones of the teeth of said shaft member;
   means for rotating said gear means to move said shaft member along a vertical axis when said gear teeth are in mating engagement with said shaft teeth;
   user-operable means of securing said shaft member in a predetermined position with respect to said gear means so that said shaft teeth are in mating engagement with said gear teeth when said user-operable means is in a first position and for allowing said shaft member to be rotated to disengage said shaft teeth from said gear teeth when said user-operable means is in a second position; and,
   a housing in which said gear means and at least a portion of said shaft member are disposed, said user-operable means including a movable stop member disposed between said housing and said shaft member.

2. The apparatus according to claim 1 wherein said shaft member includes an elongated bar having a substantially rectangular shape, said bar having a first surface which is in facing relationship with said gear means and second and third surfaces which are substantially orthogonal with respect to said first surface on opposite sides thereof, said shaft teeth being disposed on said first surface, said stop member being in contact with said second surface when said stop member is in said first position and being in contact with said first surface when said stop member is in said second position.

3. The apparatus according to claim 2 wherein said stop member is comprised of a stop bar substantially in the shape of a rectangular prism, a portion of said stop bar adjacent to said shaft member being bevelled to allow said stop bar to contact the second surface of said elongated bar when said stop bar is in the first position and to provide sufficient clearance between the shaft teeth and stop bar to allow said shaft member to be rotated when said stop bar is in the second position.

4. The apparatus according to claim 3 wherein a portion of said shaft teeth adjacent to said stop bar are bevelled to cooperate with the bevelled portion of said stop bar to provide sufficient clearance between the shaft teeth and stop bar to allow said shaft member to be rotated when said stop bar is in the second position.

5. The apparatus according to claim 1 wherein said user-operable means further includes a pin member coupled to the stop member and a spring member coupled to said pin member for biasing said pin member and said stop member toward said first position.

6. The apparatus according to claim 5 wherein said pin member includes a handle to facilitate operation thereof by the user.

7. The apparatus according to claim 5 wherein said housing has first and second slots communicating between inner and outer surfaces of said housing, said slots being oriented diagonally with respect to said shaft member and being substantially parallel with respect to one another, a portion of said pin member extending through said first slot to engage said stop member.

8. The apparatus according to claim 7 wherein said stop member includes a projection member extending through the second slot and engaging the outer surface of said housing, said projection member cooperating with said pin member to constrain said stop member to move between said first and second positions along respective axes of said first and second slots.

9. The apparatus according to claim 8 wherein said first and second slots extend upwardly at an angle of approximately 45 degrees in a direction away from said shaft member, said stop member being in the first position when said pin member and said projection member are at their lowest positions within the respective first and second slots and being in the second position when said pin member and said projection member are in their highest positions within the respective first and second slots.

10. A jacking apparatus, comprising:
    a housing;
    a shaft member having a plurality of teeth arranged longitudinally along the length thereof, said shaft member being at least partially disposed within said housing;

rotatable gear means having a plurality of gear teeth for mating with respective ones of said shaft teeth, said gear means being disposed within said housing;

means for rotating said gear means to move said shaft member along a vertical axis with respect to said gear means when said gear teeth are in mating engagement with said shaft teeth; and means for selectively engaging said gear teeth with and disengaging said gear teeth from said shaft teeth, comprising:

a stop member moveable between a first position at which said stop member holds said shaft member in alignment with said gear means so that said shaft teeth are in mating engagement with said gear teeth and a second position at which said stop member allows said shaft member to be rotated about its own axis to disengage the shaft teeth from the gear teeth, thereby facilitating vertical movement of said shaft member when there is no load on the jacking device;

a pin member coupled to the stop member and a spring member coupled to said pin member for biasing said pin member and said stop member toward said first position;

first and second parallel slots communicating between inner and outer surfaces of said housing, said slots being oriented diagonally with respect to said shaft member, a portion of said pin member extending through said first slot to engage said stop member; and a projection member extending outwardly from said stop member and through the second slot for engaging the outer surface of said housing, said projection member cooperating with said pin member to constrain said stop member to move between said first and second positions along the respective axes of said first and second slots.

11. The apparatus according to claim 10 wherein said pin member includes a handle to facilitate manual movement of said pin member and said stop member between said first and second positions.

12. A quick release apparatus for a jack having a housing, a shaft member with a plurality of teeth arranged longitudinally thereon, rotatable gear means having a plurality of gear teeth for mating with respective ones of the shaft teeth and means for rotating the gear means to move the shaft member along a vertical axis when the gear teeth are in mating engagement with the shaft teeth, said apparatus comprising:

a stop member disposed between said housing and said shaft member, said stop member being moveable between a first position at which said stop member holds said shaft member in alignment with said gear means so that said shaft teeth are in mating engagement with said gear teeth and a second position at which said shaft member is allowed to rotate about its own axis to disengage the shaft teeth from the gear teeth, thereby allowing the shaft member to be selectively raised and lowered when there is no load on the jack; and user-operable means coupled to said stop member for moving said stop member between said first and second positions.

13. The apparatus according to claim 12 wherein said means for moving said stop member is comprised of a pin member coupled to the stop member and a spring member coupled between said pin member and said housing for biasing said pin member and said stop member toward said first position.

14. The apparatus according to claim 13 wherein said housing has first and second parallel slots communicating between inner and outer surfaces of said housing, said slots being oriented diagonally with respect to said shaft member, a portion of said pin member extending through said first slot to engage said stop member.

15. The apparatus according to claim 14 wherein said stop member includes a projection member extending through a second slot and engaging the outer surface of said housing, said projection member cooperating with said pin member to constrain said stop member to move between first and second positions along the respective axes of said first and second slots.

16. The apparatus according to claim 15 wherein selected portions of said stop member and said shaft teeth are bevelled to allow said shaft teeth to clear said stop member when said stop member is in the second position and said shaft member is rotated to disengage said shaft teeth from said gear teeth.

* * * * *

UNITED STATES PATENT AND TRADEMARK OFFICE
CERTIFICATE OF CORRECTION

PATENT NO. : 4,702,458

DATED : October 27, 1987

INVENTOR(S) : Billy J. Kendrick

It is certified that error appears in the above-identified patent and that said Letters Patent is hereby corrected as shown below:

Column 2, line 36, "portiono f" should be -- portion of --.

Column 4, line 19, "stpo" should be -- stop --.

Column 4, line 55, "with" should be -- within --.

Column 5, line 61, "of" should be -- for --.

Signed and Sealed this

Twenty-ninth Day of March, 1988

Attest:

DONALD J. QUIGG

*Attesting Officer*  *Commissioner of Patents and Trademarks*